United States Patent
Bode et al.

[19]

[11] Patent Number: 5,862,456
[45] Date of Patent: Jan. 19, 1999

[54] VEHICLE DEVICE FOR DATA TRANSMISSION TO A STATIONARY BEACON, AND RESULTANT COMMUNICATION SYSTEM

[75] Inventors: Friedrich-Wilhelm Bode, Apelern; Hans-Juergen Fischer, Hildesheim; Hans-Ulrich Rossius, Harsum; Andreas Vahle, Hildesheim, all of Germany

[73] Assignee: Robert Bosch GmbH, Stuttgart, Germany

[21] Appl. No.: 826,298

[22] Filed: Mar. 27, 1997

Related U.S. Application Data

[63] Continuation of Ser. No. 334,803, Nov. 4, 1994, abandoned, which is a continuation of Ser. No. 54,688, Apr. 28, 1993, abandoned.

[30] Foreign Application Priority Data

Apr. 28, 1992 [DE] Germany .......................... 42 13 882.5

[51] Int. Cl.$^6$ .................................................. H04B 1/38
[52] U.S. Cl. ........................... 455/73; 455/106; 455/107; 375/272; 342/42; 342/51
[58] Field of Search .................................... 455/507, 517, 455/73, 78, 101, 102, 103, 104, 106, 107, 108, 109, 115, 126, 186.1, 186.2, 203, 204, 205, 207, 209; 375/272, 273, 274, 275, 279; 342/40, 42, 44, 50, 57; 340/825.54

[56] References Cited

U.S. PATENT DOCUMENTS

| | | |
|---|---|---|
| 3,375,516 | 3/1968 | Hart et al. . |
| 3,668,526 | 6/1972 | Raskin . |
| 3,958,244 | 5/1976 | Lee et al. .................................. 455/115 |
| 4,081,748 | 3/1978 | Batz . |
| 4,193,035 | 3/1980 | Berger ...................................... 455/203 |
| 4,357,593 | 11/1982 | Von Tomkewitsch ..................... 340/23 |

(List continued on next page.)

FOREIGN PATENT DOCUMENTS

| | | |
|---|---|---|
| A-0 113 571 | 7/1984 | European Pat. Off. . |
| A-0 218 843 | 4/1987 | European Pat. Off. . |
| 0 263 332 | 4/1988 | European Pat. Off. . |
| 0 309 855 | 4/1989 | European Pat. Off. . |
| 0 317 181 | 5/1989 | European Pat. Off. . |
| 0 368 545 | 5/1990 | European Pat. Off. . |
| 0 444 416 | 9/1991 | European Pat. Off. . |
| 0 457 460 | 11/1991 | European Pat. Off. . |
| 2 743 370 | 8/1982 | Germany . |
| 27 43 370 | 8/1982 | Germany . |

(List continued on next page.)

OTHER PUBLICATIONS

Johnson et al. "A Double–Side Band Doppler VHF Omnirange Beacon" Proceding of IREE, Apr. 1975.

G. Freij, D. De Preter, R. Schuessler, "Technological Options for Vehicle–Beacon Communication" Sep. 1990, pp. 11–19.

Brägas & Deuper, "Von ALI zum IVB," Bosch Technische Berichte, vol. 8, No. 1, pp. 26–31, Robert Bosch GmbH, Stuttgart 1986.

Automotive Electronics Journal, Jan. 29, 1990, p. 19.

Von Tomkewitsch, "Dynamic Route Guidance . . . " IEEE Transactions on Vehicular Technology, vol. 40, No. 1, Feb. 1991, pp. 45–50.

(List continued on next page.)

*Primary Examiner*—Thanh Cong Le

[57] ABSTRACT

A device of a vehicle for data transmission to a stationary beacon 91), which has a transceiver, comprising an on-board unit (2) with an antenna (6) for receiving a continuous signal (5), broadcast by the beacon (1), and for transmitting the received signal (5) back after modulation with a data signal (i(t)), is characterized in that the signal (7) transmitted back by the on-board unit (2) is a double-sideband signal. In that case, the on-board unit (2) can be designed as extremely simply and in the simplest case comprises a diode (9) connected to the base of the antenna (6).

3 Claims, 2 Drawing Sheets

U.S. PATENT DOCUMENTS

| | | |
|---|---|---|
| 4,490,830 | 12/1984 | Kai et al. . |
| 4,513,412 | 4/1985 | Cox . |
| 4,521,878 | 6/1985 | Toyohaga . |
| 4,528,697 | 7/1985 | Nichols . |
| 4,584,692 | 4/1986 | Yazuka et al. ............................ 455/104 |
| 4,628,517 | 12/1986 | Schwarz et al. . |
| 4,742,573 | 5/1988 | Popovic . |
| 4,850,037 | 7/1989 | Bochmann . |
| 4,890,076 | 12/1989 | Higashi et al. . |
| 4,962,534 | 10/1990 | Taylor et al. . |
| 5,036,331 | 7/1991 | Dallabetta et al. . |
| 5,081,458 | 1/1992 | Meunier . |
| 5,095,535 | 3/1992 | Freeburg . |
| 5,097,484 | 3/1992 | Akaiwa . |
| 5,101,510 | 3/1992 | Duckeck ................................. 455/186 |
| 5,119,099 | 6/1992 | Hurayama et al. ........................ 342/51 |
| 5,136,264 | 8/1992 | Nardozza ................................... 375/65 |
| 5,164,719 | 11/1992 | Guena et al. . |
| 5,164,985 | 11/1992 | Nysen ....................................... 455/73 |
| 5,201,071 | 4/1993 | Webb ....................................... 455/101 |
| 5,203,018 | 4/1993 | Hirose ..................................... 455/101 |
| 5,319,802 | 6/1994 | Camiade . |

FOREIGN PATENT DOCUMENTS

| | | |
|---|---|---|
| A-33 01 512 | 2/1984 | Germany . |
| 3 248 544 | 7/1984 | Germany . |
| 34 23 289 | 1/1986 | Germany . |
| 39 05 493 | 8/1990 | Germany . |
| 40 21 636 | 1/1991 | Germany . |
| 0-233620 | 9/1988 | Japan . |
| 459440 | 12/1991 | Japan ..................................... 455/107 |
| 4-140934 | 5/1992 | Japan . |
| 2 221 820 | 2/1990 | United Kingdom . |
| A-83 03505 | 10/1983 | WIPO . |
| WO 90/04866 | 5/1990 | WIPO .................................... 455/104 |

OTHER PUBLICATIONS

Christopher O'Malley, "Electronics as Your Co–Pilot," *Popular Science,* Sep. 1991, pp. 66–69.

Zinke & Brunswig, *Lehrbuch Der Hochfrequenztechnik,* 2nd Ed., vol. 2, Springer–Verlag, Berlin–Heidelberg–New York, pp. 301–320.

P.T. Blythe, "Advanced Telematics in Road Transport," Proceedings of the DRIVE Conference, Brussels, Belgium 1991 vol. 1, pp. 248–269; Elsevier for Commission of the Eur.Comm. European Radiocommunications Committee, Report 3, Lisbon, Feb. '91.

A Communication Architecture for Real–Time Applications in Short Range Mobile Radio Networks, Kremer et al, 41st IEEE Vehicular Technology Conference, May 1991, St. Louis, MO. (pp. 793–797).

Lothar Tschimpke "Mobile UKW–Empfang im bebautem . . . " [Mobile FM reception in built–up areas and recep. improvement using diversity] in 579 *Rundfunktechnische Mitteilungen,* vol. 24 No. 1, pp. 16–20 (1981). [Broadcast Technology News].

VEHICLE DEVICE FOR DATA TRANSMISSION TO A STATIONARY BEACON, AND RESULTANT COMMUNICATION SYSTEM

This application is a Continuation, of application Ser. No. 08/334,803, filed Nov. 4, 1994, abandoned which is a Continuation of application Ser. No. 08/054,688. filed on Apr. 28, 1993, now abandoned.

Cross-reference to related patents and applications, assigned to a subsidiary of the present assignee, the disclosures of which are hereby incorporated by reference: U.S. Pat. No. 5,195,109, BOCHMANN et al., issued Mar. 16, 1993; U.S. Pat. No. 4,939,791, BOCHMANN, issued Jul. 3, 1990; U.S. Ser. No. 07/908,185, WIEDEMANN, filed Jul. 1, 1992; U.S. Ser. No. 07/910,643, BOCHMANN, filed Jul. 8, 1992; U.S. Ser. No. 07/935,848, WIEDEMANN et al., filed Aug. 26, 1992. to related applications, assigned to the assignee of the present application: DE-OS 40 39 887 (pub. Jun. '92) and corresponding PCT/DE 91/00926, filed Nov. 27, 1991, of which the U.S. national phase is U.S. Ser. No. 08/039,336SIEGLE et al., filed Apr. 27, 1993(RB docket R. 24037); German applications of Apr. 28, 1992: P 42 13 879, P 42 13 880, and P 42 13 881, and corresponding U.S. applications filed Apr. 28, 1993: 08/054,686, 08/054,687, and 08/054,685, respectively.

FIELD OF THE INVENTION

The invention relates generally to a vehicle device for data transmission to a stationary beacon, which has a transceiver unit, comprising an on-board unit with an antenna for receiving a continuous signal transmitted by the beacon and for returning the received signal after modulation with a data signal. The invention also relates to a communication system formed with such a device.

BACKGROUND

Particularly for traffic control technology, a system is provided in which data transmission is done from a vehicle moving past a stationary beacon to that beacon. Since it is not practical to equip the vehicles themselves with a transmitter, provision is made for having carrier signals transmitted continuously from the beacon; these signals are then received by the vehicle moving past and are modulated with a data signal. The carrier frequencies in question are in the microwave range (such as 5.8 GHz). The carrier signal is received by the antenna of the vehicle moving past and is modulated with a data signal generated locally in the vehicle.

It is known for the modulation to be done at the base of the antenna at different frequencies provided for the two logical states of the data signal and for the carrier signal to be reflected in modulated form from the antenna, so that transmission power of its own need not be furnished by the vehicle. The modulation methods used are typically frequency-encoding ones, by which the carrier frequency is shifted by a different frequency as a function of logical "1" than as a function of logical "0" (this is known as frequency shift keying). To enable furnishing the on-board unit as mass-produced equipment with the least possible expense, the attempt has been made to design suitable encoders as simply as possible.

SUMMARY OF THE INVENTION

Based on the problem of making it feasible to retransmit the signal, transmitted from the beacon, in modulated form with the simplest possible on-board unit, the device according to the invention is characterized in that the signal transmitted back by the on-board unit is a double-sideband signal.

In the double-sideband signal used according to the invention, the data information is contained in both sidebands. Compared with pure frequency-shift keying (FSK), there is accordingly the disadvantage of a larger used bandwidth and a lower reflection power per sideband. The invention is based on the recognition that these disadvantages are acceptable if increased expense for equipment is accepted in the beacon. The advantage attainable with the invention is that the on-board unit can be designed as extraordinarily simple, and in the extreme case comprises a single diode connected to the base of the antenna and switched back and forth between the blocking and the conducting state by modulated pulse-type signals. The increase in the expenditure in the stationary beacon, by comparison, is not a major consideration, because this is a one-time investment, while the on-board units are mass-produced products built into the vehicles.

To increase the transmission reliability for the data, two spatially separated antennas that transmit the double-sideband signals back may be provided in the on-board unit. As a result, many local interference factors can be rendered ineffective.

DRAWING

The invention is described in further detail below in terms of an exemplary embodiment shown in the drawing.

FIG. 1 is a schematic diagram of the layout of an on-board unit and of a beacon;

FIG. 2 contains two frequency diagrams for the states of logical "0" and logical "1".

DETAILED DESCRIPTION

Figure 1:
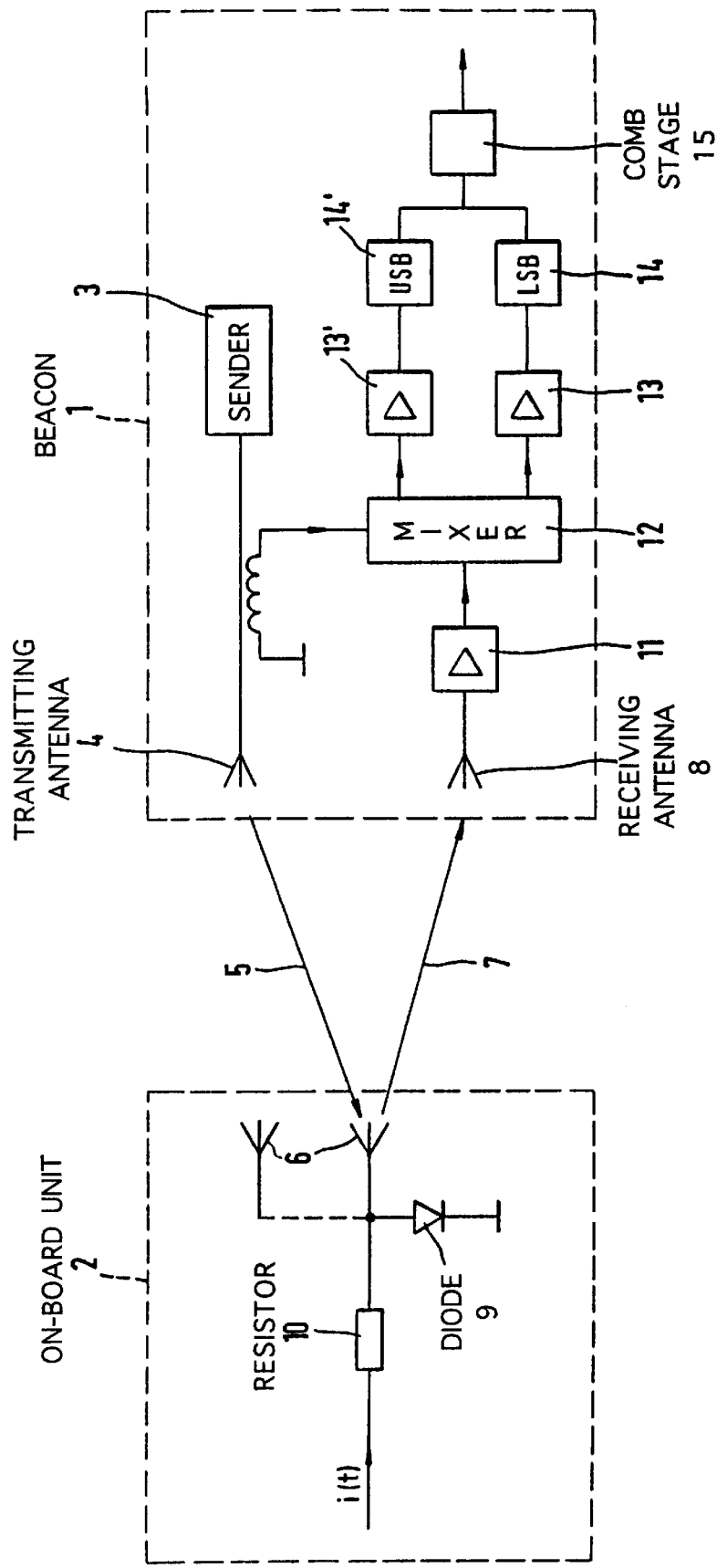

FIG. 1 is a block circuit diagram for the transceiver device in a beacon 1 and for the circuit arrangement in an on-board unit 2 of a vehicle.

Located in the beacon is a transmitter 3, from whose antenna 4 a carrier frequency signal 5 is broadcast continuously.

If the carrier frequency signal 5 hits an antenna 6 of an on-board unit 2 of a vehicle moving past it, it is reflected in modulated form and arrives in the form of a reflected signal 7 at a receiving antenna 8 of the beacon.

At the base of the antenna 6 of the on-board unit 2, only one diode 9 is connected to ground. Via a resistor 10, a modulation signal i(t) is coupled to the junction between the diode 9 and the antenna 6. The modulation signal i(t), at a frequency of several megahertz, controls the diode 9 to the conducting or blocking state and thus varies the base resistance of the antenna. The diode 9 thus acts as an impedance controlled by the modulation signal i(t). The high-frequency carrier frequency signal is thus modulated with a relatively low frequency (in the megahertz range) because of the fact that in one state of the diode 9, virtually no reflection from the antenna 6 to the receiving antenna 8 takes place, while in the other state of the diode 9, the incident signal 5 is reflected as completely as possible. The reflected signal 7 received by the receiving antenna 8 of the beacon is amplified in a receiver amplifier 11 and with the aid of an image rejection mixer 12 is split to the two sidebands. The two sidebands are present at different outputs of the image rejection mixer 12 and are processed separately, each with one amplifier 13, 13' and one demodulator 14, 14'. The outputs of the two demodulators 14, 14' are joined together and connected to one input of a combination stage 15, at whose output the transmitted data signal is present.

Figure 2:
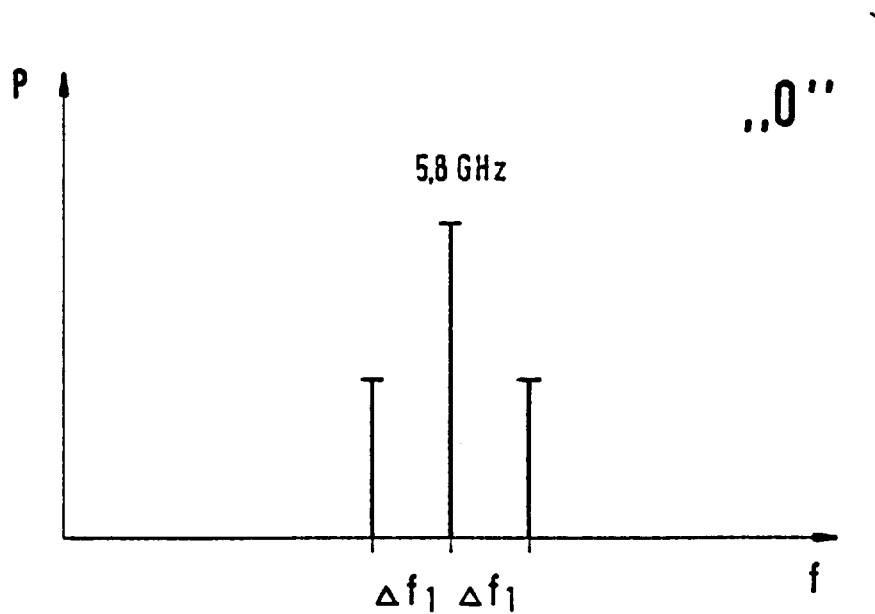
Figure 2:
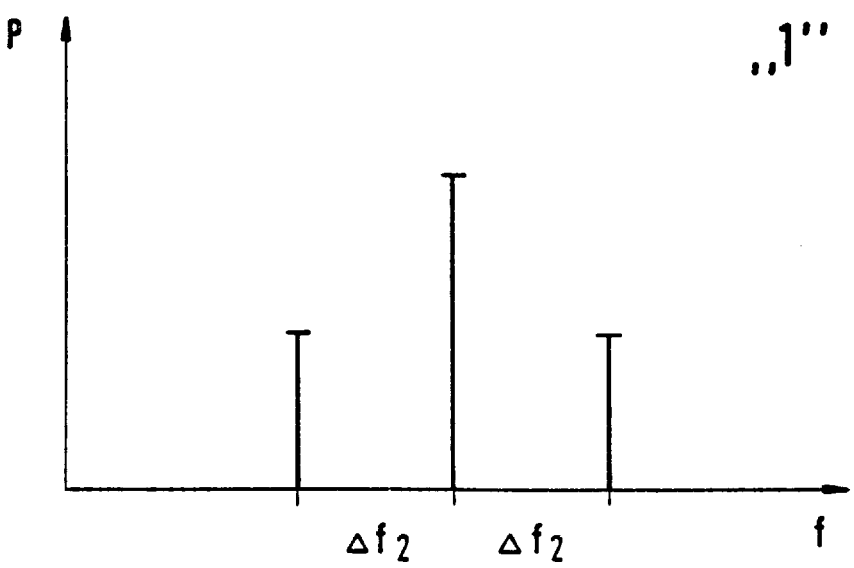

With the simple arrangement of the diode 9 in the on-board unit 2, a double-sideband modulation is produced, as illustrated in FIG. 2. For a logical signal "0", the two-state modulation signal i(t) has a lower frequency, for instance, than for logical "1". In a realistic exemplary embodiment, logical "0" corresponds to a frequency of the signal i(t) of 1.5 MHz, while "1" corresponds to a frequency of 2 MHz.

By comparison, the sidebands that are shown in FIG. 2 have a different spacing from the carrier frequency for logical "0" and for logical "1", namely delta $f_1$, and delta $f_2$, respectively. The double-sideband modulation according to the invention leads in the beacon 1 to the use of a relatively complicated and expensive image rejection mixer and of separate processing paths for the two sidebands. This increased expense results in a double processing of the data signals, however, thereby producing increased reliability of transmission.

In a further embodiment of the invention, provision is made for the use of some other signal encoding scheme, such as pulse code modulation, instead of frequency modulation.

Various changes and modifications may be made, and features described in connection with any one of the embodiments may be used with any of the others, within the scope of the inventive concept.

What is claimed is:

1. A device of a vehicle for data transmission to a stationary beacon (1), comprising:

a transceiver, comprising an on-board unit (2) with a single antenna (6) for receiving a high-frequency carrier signal (5) broadcast continuously by the beacon (1) and reflecting said carrier signal, after it has been modulated, back to the beacon;

modulating means (9, 10), connected to a base portion of said single antenna, for modulating said received carrier signal with a relatively low frequency two-state data signal (i(t)), said modulating means including a controllable impedance (9) connected to said base portion of said antenna (6);

wherein said controllable impedance is a single diode (9) operable at approximately 5.8 GHz as said high frequency carrier signal, and wherein said single diode (9) responds, by switching is alternately to a blocking or high impedance state and a conductive or low impedance state to (i) a first encoded signal by causing said antenna to output two sidebands of a frequency or phase shift keying signal with a first frequency (f1) indicative of a logical zero, and to (ii) a second encoded signal by causing said antenna to output two sidebands of a frequency or phase shift keying signal with a different second frequency (f2) indicative of a logical one, said first and second encoded signals defining alternate states of said two-state data signal, wherein said single diode (9) is switchable back and forth between said blocking or high impedance state and said conductive or low impedance state by pulses of said two-state data signal (i(t)); and wherein said single diode (9) has an anode connected to said base portion of said antenna (6) and a cathode connected to ground.

2. The device of claim 1, wherein the first frequency is 1.5 MHz, representing a logical zero state, and the second frequency is 2 MHz, representing a logical one state.

3. A communication system comprising:

a stationary beacon (1) having a transmitting antenna (4) for continuously transmitting a high-frequency carrier signal, a receiving antenna (8), and means (13, 13'; 14, 14') for separate processing of upper and lower received sideband signals; and an on-board unit (2) on a vehicle, including a transceiver with a single antenna (6) for receiving the high-frequency carrier signal (5) broadcast continuously by the beacon (1) and for reflecting said signal back to said beacon after frequency or phase shift keying modulation with a logically generated two-state data signal (i(t)), and modulating means (9, 10), connected to a base portion of said single antenna, for modulating said received carrier signal with a relatively low frequency two-state data signal (i(t)), said modulating means including a controllable impedance (9) connected to said base portion of said antenna (6);

wherein said controllable impedance is a single diode (9) operable at approximately 5.8 GHz as said high frequency carrier signal, and wherein said single diode (9) responds, by stitching alternately to a blocking or high impedance state and a conductive or low impedance state to (i) a first encoded signal by causing said antenna to output two sidebands of a frequency or phase shift keying signal with a first frequency (f1) indicative of a logical zero, and to (ii) a second encoded signal by causing said antenna to output two sidebands of a frequency or phase shift keying signal with a different second frequency (f2) indicative of a logical one, said first and second encoded signals defining alternate states of said two-state data signal, wherein said single diode (9) is switchable back and forth between said blocking or high impedance state and said conductive or low impedance state by pulses of said two-state data signal (i(t)); and wherein said single diode (9) has an anode connected to said base portion of said antenna (6) and a cathode connected to ground.

* * * * *